United States Patent

[11] 3,630,367

[72] Inventor Allan H. Willinger
 Maywood, N.J.
[21] Appl. No. 832,172
[22] Filed June 11, 1969
[45] Patented Dec. 28, 1971
[73] Assignee Aquariums Incorporated
 Maywood, N.J.
 Continuation-in-part of application Ser. No.
 581,208, Sept. 22, 1966, now Patent No.
 3,477,588. This application June 11, 1969,
 Ser. No. 832,172
 The portion of the term of the patent
 subsequent to Nov. 11, 1986, has been
 disclaimed.

[54] BOTTOM AQUARIUM FILTER
 11 Claims, 8 Drawing Figs.
[52] U.S. Cl. .................................................. 210/169
[51] Int. Cl. .................................................. E04h 3/20
[50] Field of Search ...................................... 210/169

[56] References Cited
UNITED STATES PATENTS

| 2,773,828 | 12/1956 | Schiavo............... | 210/169 X |
| 2,782,161 | 2/1957 | Willinger et al. ...... | 210/169 |
| 3,301,402 | 1/1967 | Falkenberg et al. .... | 210/169 |
| 3,477,580 | 11/1969 | Willinger.............. | 210/169 |

Primary Examiner—Reuben Friedman
Assistant Examiner—T. A. Granger
Attorney—Friedman & Goodman ABSTRACT: A bottom aquarium filter for an aquarium tank having contaminated and decontaminated water therein, said filter comprising in combination a container having an inlet compartment in fluid flow relation with said tank and a filtration compartment in fluid flow relation with said inlet compartment, said filtration compartment adaptable to contain a mass of filtering material and having a first opening for the ingress of air into said filtration compartment and egress of decontamination out of said filtration compartment, said inlet compartment having inlet means through which contaminated water from the tank may flow and venting means associated with said filter.

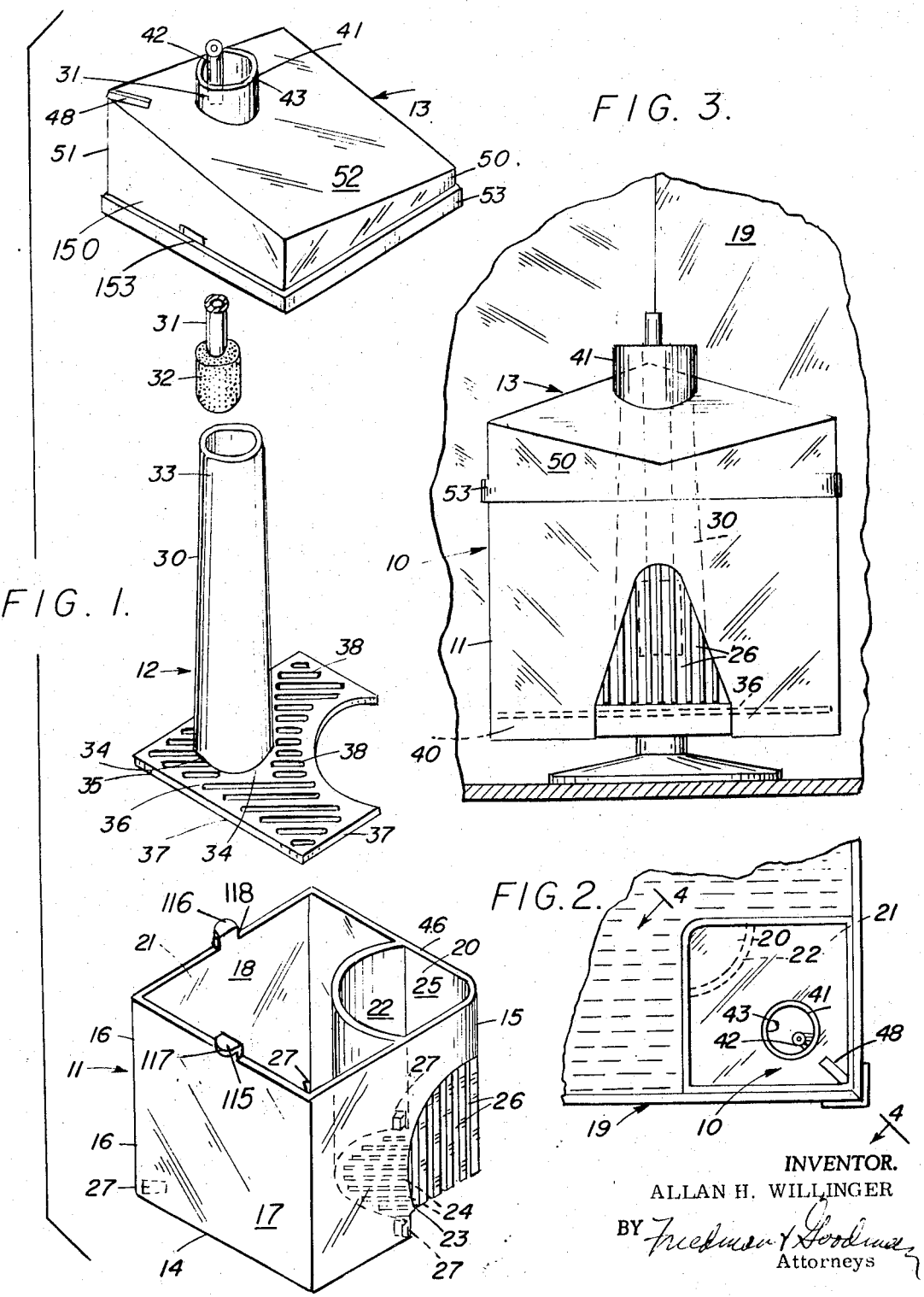

INVENTOR.
ALLAN H. WILLINGER
BY Friedman & Goodman
Attorneys

BOTTOM AQUARIUM FILTER

CROSS-REFERENCE TO RELATED APPLICATION

This application is a continuation-in-part of U.S. application Ser. No. 581,208, filed Sept. 22, 1966 now U.S. Pat. No. 3,477,580.

BACKGROUND OF THE INVENTION

1. Field of the Invention

The present invention relates to an aquarium filter and more particularly to a bottom aquarium filter.

2. Description of the Prior Art

Bottom aquarium filters are, of course, well known. A typical example may be found in U.S. Pat. No. 2,782,161.

SUMMARY OF THE INVENTION

An object of the present invention is to provide a compartmentalized bottom aquarium filter.

In accordance with the invention, there is now provided a bottom aquarium filter for an aquarium tank having contaminated and decontaminated water therein, said filter comprising in combination a container having an inlet compartment in fluid flow relation with said tank and a filtration compartment in fluid flow relation with said inlet compartment, said filtration compartment adaptable to contain a mass of filtering material and having a first opening for the ingress of air into said filtration compartment and egress of decontaminated water out of said filtration compartment, said inlet compartment having inlet means comprising an inlet in the lower end of the compartment thereof above aquarium bottom particles through which contaminated water from the tank may flow and an air stream supply means disposed in said container which directs ingressed air from said first opening into said filtration compartment thereby causing contaminated water from said tank to flow through said inlet into said inlet compartment and therefrom into said filtration compartment where said contaminated water is substantially decontaminated by said filtering material before being egressed through said first opening into said tank and wherein said container has a bottom wall formed with a portion thereof elevated upwardly of the remainder thereof, a partition extending upwardly from said bottom wall which separates the elevated portion of said bottom wall from the remainder thereof and forms said inlet compartment in fluid flow relation with said filtration compartment, said container also having a front wall, said partition extending upwardly from said bottom wall and merging into said front wall, openings in said bottom wall forming said inlet and in said front wall and venting means associated with said filter.

BRIEF DESCRIPTION OF THE DRAWING

The invention will be hereinafter more fully described with reference to the accompanying drawing in which:

FIG. 1 is an exploded view of the inventive device.

FIG. 2 is a top view of the inventive device disposed in the bottom of an aquarium tank.

FIG. 3 is a front view of the inventive device disposed in the bottom of an aquarium tank.

DESCRIPTION OF THE SPECIFIC EMBODIMENTS

Figure 4:
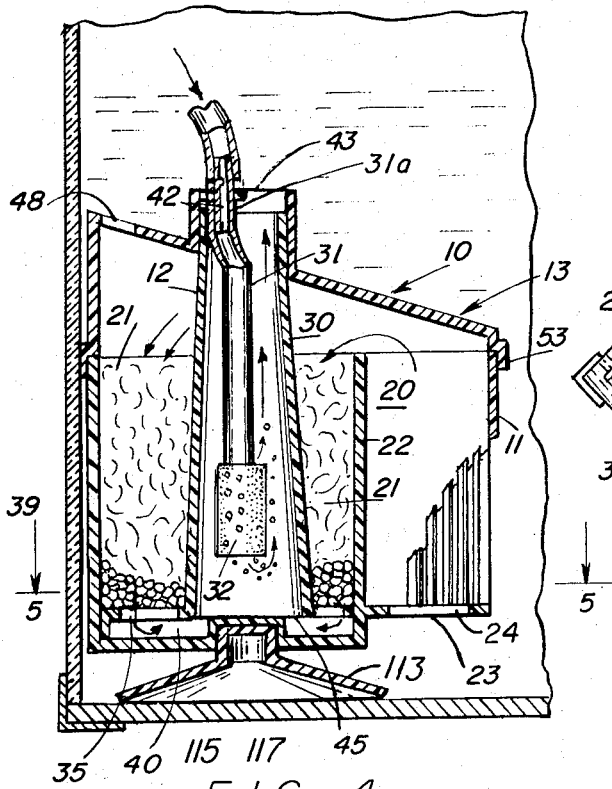
FIG. 4 is a view of the inventive device taken substantially along the line 4—4 of FIG. 2.

Referring now to the drawings wherein like reference characters designate like or corresponding parts throughout the several views, there is shown in FIGS. 3 and 4 an aquarium filter assembly 10 disposed in the bottom of an aquarium tank 19 having contaminated and decontaminated water therein. As shown in FIGS. 1 and 4, the assembly comprises a filter receptacle 11 for housing an air stream supply means 12 and a mass of filtering materials 39. The top of the receptacle 11 is preferably a removable cover 13 which encloses the open upper end of the receptacle.

The receptacle 11 may be any container having a compartmentalizable configuration. The said receptacle is advantageously a substantially rectangular container comprising a bottom wall 14 and opposing front 15 and rear 16 walls extending upwardly from the bottom wall and substantially normal thereto. The rear wall 16 is advantageously a V-shaped member having left 17 and right 18 sections formed substantially normal with respect to each other. Generally centrally located, at each upper edge of sections 17 and 18, is an upwardly extending tab 117, 118, respectively, integral and in planar relation therewith. In turn, each tab is further provided with an outwardly projecting curved lip 115, 116, respectively. The front wall 15 is advantageously a curvilinear member extending between the free ends of the V-shaped rear wall 16 and along the lines of juncture therewith substantially normal thereto. The container 11 is provided with an inlet compartment or supply chamber 20 in fluid flow relation with a filtering compartment 21. A curvilinear partition 22 extending upwardly from the bottom wall 14 separates the inlet compartment 20 from the filtering compartment 21. The partition 22 is formed substantially normal to the bottom wall 14 and merges into the front wall 15. The partition is connected within the container to define the inlet compartment adjacent to the filtration compartment and in fluid flow relation therewith. The partition separates a portion 23 of the bottom wall 14 from the remainder thereof. This portion 23 is disposed in a plane parallel to a plane defined by the remainder of the bottom wall and at a level upwardly thereof. The inlet compartment 20 is provided with an inlet means which may advantageously be an opening in the lower end thereof through which contaminated water from the tank 19 may flow. The opening is advantageously comprised of openings 24 in the bottom wall portion 23 which may advantageously be slots formed to accommodate the passage of contaminated aquarium water therethrough and openings 26 in the lower end of the front wall 15 which may advantageously be similarly formed. The partition 22 separates a section 25 of the front wall from the remainder thereof. The front wall openings 26 are advantageously located in said section 25. Together, slots 24 and 26 are inlet means through which aquarium water having contaminants such as debris, dirt, excretion, wastes, food waste and the like entrained therein is caused to flow when the air stream supply means 12 directs air into the filtration compartment 21 to airlift clean water therefrom. As best shown in FIG. 4, the contaminated water flows upwardly through the supply chamber 20, over the upwardmost end of the partition 22, and into the filtering compartment 21. It is seen that locating the inlet means in the bottom of the container, as shown in FIGS. 1 and 4, facilitates drawing contaminated aquarium water from the bottom or lower regions of the tank 19. Further, it is seen that the provision of an opening 24 in the portion 23 of the bottom wall 14 that is elevated above the remainder thereof allows contaminated water to be drawn upwardly from the bottom of the tank.

It should be understood, of course, that it is not essential to the best mode of the invention as described herein that the partition 22 extend upwardly to a position flush with the upper edge 46 of the front wall 15. The partition 22 would function as the desired compartmentalizing element if it were either extended above the upper edge 46, or extensively foreshortened, or otherwise terminated at a level above or below the upper edge of the front wall 15. Further, the desired results would just as easily be achieved by providing an opening or openings in a single partition 22 or in partitions generally. Distinctive features of the invention are to provide for a compartment in fluid flow relation with a second compartment and also provide for intake of aquarium water into one of said compartments for subsequent transfer therefrom into the other of said compartments. Further, it should be understood that the location of the inlet means 24, 26 as specifically shown in FIGS. 1 and 4 is not essential to the inventive device. The inlet means may be otherwise located in the lower portion of the container and be an opening or openings of any size and shape desired so long as the marine life such as fish, snails, turtles and the like which are contained in the aquarium to which the inventive device is adapted are unable to swim, walk or otherwise pass through the inlet means 24, 26.

Figure 5:
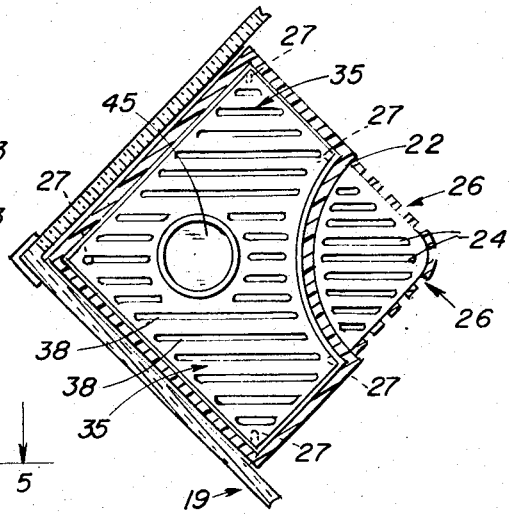
FIG. 5 is a top view of the inventive device taken substantially along the line 5—5 of FIG. 4.

As shown in FIG. 1, the main filtering compartment 21 is provided with supporting means 27 which may be of any configuration including a projection or opening to receive a projection, or any combination thereof formed in or on the wall, walls or partition 14, 15, 16 and 22, or any combination thereof. As best shown in FIGS. 1 and 5, the supporting means 27 is advantageously a series of five substantially rectangular elements connected to the bottom wall 14 of the container and adapted to support the airstream supply means 12 above the bottom wall 14, as will hereinafter be more fully described.

The air stream supply means assembly 12 comprises a first elongated member 30 which is adapted to receive an air permeable element 32 carried by a second elongated annular member 31 through which air is pumped by means not shown.

The first elongated member 30 is advantageously a funnel having an upper end 33 and a lower end 34 of greater annular dimension that said upper end. A platform 35 carried by the lower end 34 of the funnel is adaptable for mounting the funnel vertically within the container 11. When so mounted, the platform 35 abuts against the supporting elements 27, thereby forming a decontaminated, or clean, water chamber 40 between the platform 35 and the bottom wall 14 of the container. The platform having an upper surface 36 and a lower surface 37 is provided with openings 38 which may advantageously be slots for the passage of decontaminated water therethrough. As best shown in FIGS. 1 and 5, the platform is also provided with an orifice 45 through which clean water may flow from the clean water chamber 40 into the interior of the funnel 30. When the platform 35 is mounted in the container 11, water decontaminating materials 39 may be loaded thereon for the filtration of contaminated water. It is seen that positioning the platform 35 in the container 11 divides the filtration compartment into a filter chamber and a clear water chamber, said chambers being in fluid flow relation through said platform. As the contaminated water is pumped through the materials 39, it is decontaminated thereby and collected in the clean water chamber 40. It is understood, of course, that the supporting means 27 hereinbefore described could be carried by the platform 35 without departure from the spirit and scope of the invention.

The upper end of the funnel 33 is provided with an enclosure 41 which may advantageously be an open cap carried by the cover 13. The enclosure has an opening for the ingress of air and egress of decontaminated water which may advantageously be one opening 42 for the egress of air into the funnel and a second opening 43 for the egress of decontaminated water out of the funnel. Decontaminated water pumped through the outlet 43 may thereby be spilled into the aquarium tank from beneath the surface of the water in the tank or from above said surface. It should be understood, of course, that opening or openings need not be located in the enclosed portion of the upper end of the funnel 30. The said opening could just as easily be located anywhere in the container so long as it is adaptable for the ingress of air into the decontaminated water compartment and egress of decontaminated water therefrom.

The second elongated annular member 31 is advantageously a flexible length of tubing carried by the cap 41 and extending therethrough. The tubing 31 is associated with the opening 42 for the ingress of air. Any air pumping means well known in the art may be adaptably associated with the upper end of the tubing 31 by means of an adapter 31a, in order to pump air through the tube 31 and air permeable element 32, and into the interior of the funnel 30, as is best shown in FIG. 4.

As best shown in FIGS. 1, 3, 5 and 6, the cover 13 may be of any configuration adaptable to covering or enclosing the container 11 or equivalents thereof. The cover 13 is advantageously a substantially rectangular enclosing means having front 50 and rear 51 surfaces adaptable for mating with the container front and rear walls 15 and 16, respectively; and opposing sides 150 and 151 for mating with the container right and left sections 17 and 18, respectively. Additionally, sides 150 and 151 are each provided with a recessed slot 153 associatingly located to slidingly receive tabs 117 and 118 of the container 11, and to lock the cover in place via curved lips 115, 116 which snap in place therethrough. The cover is provided with a top surface 52 and a bottom flange 53. The top surface 52 is formed at an incline extending downwardly toward the bottom flange 53 from the rear surface 51 to the front surface 50. The bottom flange 53 secures the cover in place on the container with capacity for removal therefrom to plenish and replenish decontamination materials 39. As best shown in FIG. 4, forming the top surface 52 at an incline aids in directing the flowage of contaminated water from the inlet compartment into the filtering compartment 21. It is understood, of course, that the inlet compartment could be formed coextensively with the cover without departing from the spirit and scope of the invention.

The container 11 may also be provided with a removable base 111 so that it need not rest on the aquarium floor itself, but may be raised therefrom. Base 111 has a generally circular main body portion 113 with an upwardly tapering upper surface which merges into a circular stem portion 115. Stem portion 115 is receivable in a circular recess 117 provided for that purpose in a generally central location in the bottom wall 14 of the container.

Figure 6:
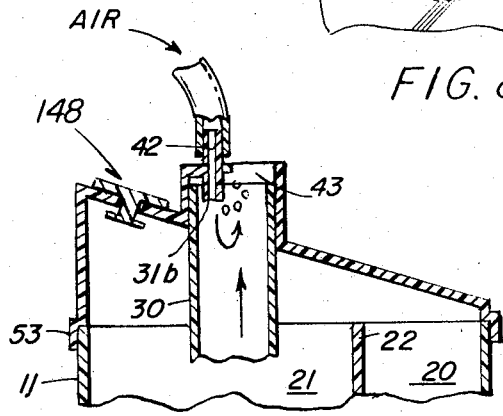
FIG. 6 is a partial view of an embodiment of the inventive device and showing the venting means associated therewith.

FIG. 6 illustrates another embodiment of an air stream supply means assembly 12 comprising a first elongated annular member 30 having an enclosed upper end, and a second elongated annular member 31b adaptable for association with the pumping means not shown. The discussion hereinbefore directed to the opening for ingress of air and egress of water is equally applicable to the embodiment shown in FIG. 6. Any air pumping means well known in the art may be adaptably associated with the member 31 as hereinbefore described.

As shown in FIGS. 2 and 4, the inventive device is adaptable for mounting in a corner of the aquarium tank 19. However, it is understood that the device may be mounted anywhere within the confines of the tank without impairing the functions of either the tank or the inventive device. The inventive device is advantageously disposed on the bottom of said tank. The bottom aquarium filter, as disclosed herein, is adaptable for decontaminating water in an aquarium tank.

In operation, as air is pumped into the funnel 30, contaminated water is thereby caused to flow from the tank 19 through the inlet means 24 and 26 and upwardly through the inlet compartment 20. The water then flows over the partition 22 and into the main filtering compartment 21 where it is decontaminated as it passes through the decontaminating materials 39. The decontaminated water then flows into the clean water chamber 40, thence upwardly through the funnel 30 and egress opening 43 and back into the tank 19.

Any materials may be used to construct the device hereinbefore described. However, the materials used in the construction of the preferred embodiment may advantageously be transparent plastic formed in the various configuration described and shown, or formed as components thereof and adhesively assembled to form said configurations. The air permeable element 32 may advantageously be an air stone means well known in the art.

Figure 8:
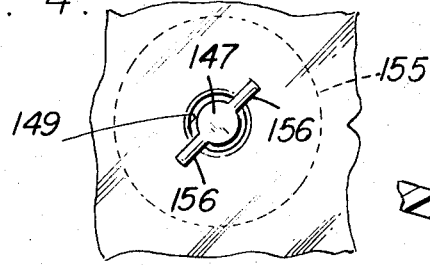
FIG. 8 is a bottom view of the floating valve of FIG. 7.
Figure 7:
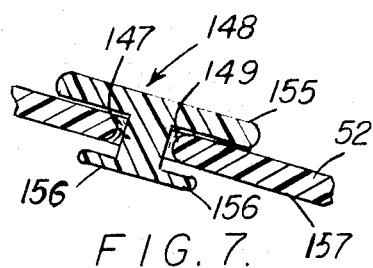
FIG. 7 is a sectional view of a floating valve used in conjunction with the venting means.

Referring now to FIGS. 1, 2 and 4, it is seen that the filter assembly 10 is provided with venting means comprising an air vent opening 48 of rectangular shape disposed in a corner of surface 52 of cover 13. The vent opening thereby allows air to escape from the filter assembly as it is lowered into the tank, and enter the filter assembly as it is raised out of the tank. Buoyancy and airlock problems are thereby expeditiously obviated. Preferably, as shown in FIGS. 6, 7 and 8, a floatable valve 148 is provided in association with the venting means. In this embodiment, the venting means comprise a generally circular aperture 149 into which the valve 148 is fitted. Valve 148 comprises a generally circular head 155, large enough to completely overlie aperture 149, a generally circular shank portion 147, which loosely fits inside aperture 149 and a pair of opposing prongs 156, which are long enough to engage the underside portion 157 of the surface 52, immediately surrounding aperture 149. Thus, in cross section, the valve 148 yields a generally H-shaped configuration with one side of the H somewhat shorter than the other. Because of the loose fit of the valve inside aperture 149, air can escape from the filter assembly. Moreover, the suction of the filtering action closes the valve and prevents water from entering through that aperture 149, thereby restricting entry of water to the filter only by the means earlier described.

It should be appreciated from the description hereinbefore set forth that the location of the inlet means, 24, 26 in the lower end of the inlet compartment 20 allows for drawing contaminated water from the lower regions of the tank 19 where contaminants in greatest concentrations generally accumulate. Thus, filtration of the most contaminated region of the tank is effectively accomplished. It should be further noted that locating the inlet means in the bottom of the tank promotes the circulatory motion of the water therein, since a water current is set up within the tank as water is drawn into the filter at the lower end thereof and egressed therefrom at the upper end thereof. This movement of water causes the tank water to circulate from the upper region of the tank to the lower region thereof and carry contaminants toward the inlet means of the filter, thereby increasing the functional efficiency of the inventive device.

What is claimed is:

1. A bottom aquarium filter for an aquarium tank having contaminated and decontaminated water therein, said filter comprising in combination a container having an inlet compartment in fluid flow relation with said tank and a filtration compartment in fluid flow relation with said inlet compartment, said filtration compartment adaptable to contain a mass of filtering material and having opening means for the ingress of air into said filtration compartment and egress of decontaminated water out of said filtration compartment, said inlet compartment having inlet means comprising an inlet in the lower end of the compartment thereof above aquarium bottom particles through which contaminated water from the tank may flow and an air stream supply means disposed in said container which directs ingressed air from said opening means into said filtration compartment thereby causing contaminated water from said tank to flow through said inlet into said inlet compartment and therefrom into said filtration compartment where said contaminated water is substantially decontaminated by said filtering material before being egressed through said opening means into said tank and wherein said container has a bottom wall formed with a portion thereof elevated upwardly of the remainder thereof, a partition extending upwardly from said bottom wall which separates the elevated portion of said bottom wall from the remainder thereof and forms said inlet compartment in fluid flow relation with said filtration compartment, said container also having a front wall, said partition extending upwardly from said bottom wall and merging into said front wall, openings in said bottom wall forming said inlet and in said front wall and venting means associated with said filter.

2. A device according to claim 1 wherein said inlet comprises slots formed to receive aquarium water having contaminants entrained therein.

3. A device according to claim 1, wherein said container includes a cover, said venting means further comprising an opening in said cover.

4. A device according to claim 3 wherein said opening further comprises an elongated aperture.

5. A device according to claim 3 wherein said opening further comprises a generally circular aperture.

6. A device according to claim 5 wherein valve means are provided for said circular aperture.

7. A device according to claim 6 wherein said valve means further comprise a floatable valve adapted to loosely fit in said circular aperture.

8. A device according to claim 7 wherein said floatable valve further comprises a generally circular head portion large enough to overlie said circular aperture, a pair of opposing prongs long enough to underlie said circular aperture and to engage the area of the cover immediately surrounding said circular aperture, a generally circular interconnecting shank portion intermediate said head portion and said prongs said circular shank portion being loosely fittable in said circular aperture.

9. A device according to claim 3 wherein said cover is lockably releasable with said container.

10. A device according to claim 1 wherein a pedestal is provided for said container.

11. A device according to claim 10 wherein said pedestal is removable.

* * * * *